United States Patent
Miyazaki et al.

(10) Patent No.: US 6,421,114 B1
(45) Date of Patent: Jul. 16, 2002

(54) THREE-DIMENSIONAL INFORMATION MEASURING APPARATUS

(75) Inventors: Makoto Miyazaki, Ibaraki; Akira Yahashi, Kobe; Tadashi Fukumoto, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/532,091

(22) Filed: Mar. 21, 2000

(30) Foreign Application Priority Data

Mar. 30, 1999 (JP) .......................................... 11-087551

(51) Int. Cl.$^7$ ............................. G01C 3/00; G01C 3/08; G01C 5/00; G02B 27/40; G02B 27/64; G02B 7/04

(52) U.S. Cl. ................................... 356/3.01; 250/201.2

(58) Field of Search ............................. 356/3.01–5.15, 356/609; 396/89, 104, 124, 137, 139, 110, 111, 116, 117, 138–143; 250/336, 201.2

(56) References Cited

U.S. PATENT DOCUMENTS

| | | | | |
|---|---|---|---|---|
| 3,984,846 A | * | 10/1976 | Gallagher et al. | 354/25 |
| 4,843,415 A | * | 6/1989 | Matsui et al. | 354/403 |
| 4,907,026 A | * | 3/1990 | Koyama et al. | 354/403 |
| 4,947,202 A | * | 8/1990 | Kitajima et al. | 354/403 |
| 5,231,443 A | * | 7/1993 | Subbarao | 354/400 |
| 5,274,429 A | * | 12/1993 | Misawa et al. | 356/1 |
| RE34,900 E | * | 4/1995 | Mogamiya et al. | 356/3.01 |
| 5,534,687 A | | 7/1996 | Ohtake | |
| 5,751,406 A | * | 5/1998 | Nakazawa et al. | 356/3.01 |
| 5,963,308 A | * | 10/1999 | Takasaki et al. | 356/3.01 |
| 6,151,118 A | * | 11/2000 | Norita et al. | 356/376 |

FOREIGN PATENT DOCUMENTS

| JP | 5-188436 | 7/1993 |
|---|---|---|
| JP | 9-145320 | 6/1997 |

* cited by examiner

Primary Examiner—Thomas H. Tarcza
Assistant Examiner—Brian Andrea
(74) Attorney, Agent, or Firm—McDermott, Will & Emery

(57) ABSTRACT

A three-dimensional information measuring apparatus is provided, which uses a distance measuring sensor provided externally to an imaging lens. The apparatus enables three-dimensional data input of a small object and makes the influence of a misregistration between the imaging lens and a distance measuring sensor uniform. The apparatus includes a light irradiation device for irradiating a reference light beam to the object, a light reception device for receiving the reference light beam reflected by the object, so as to generate data that determine the position of the object. The apparatus also includes a distance measuring sensor for measuring the distance to the object and a lens controller for adjusting the focal point of an imaging lens in accordance with the output of the distance measuring sensor. The distance measuring sensor is arranged so that the measurement axis crosses the light reception axis of the imaging lens within the measurable distance range.

18 Claims, 6 Drawing Sheets

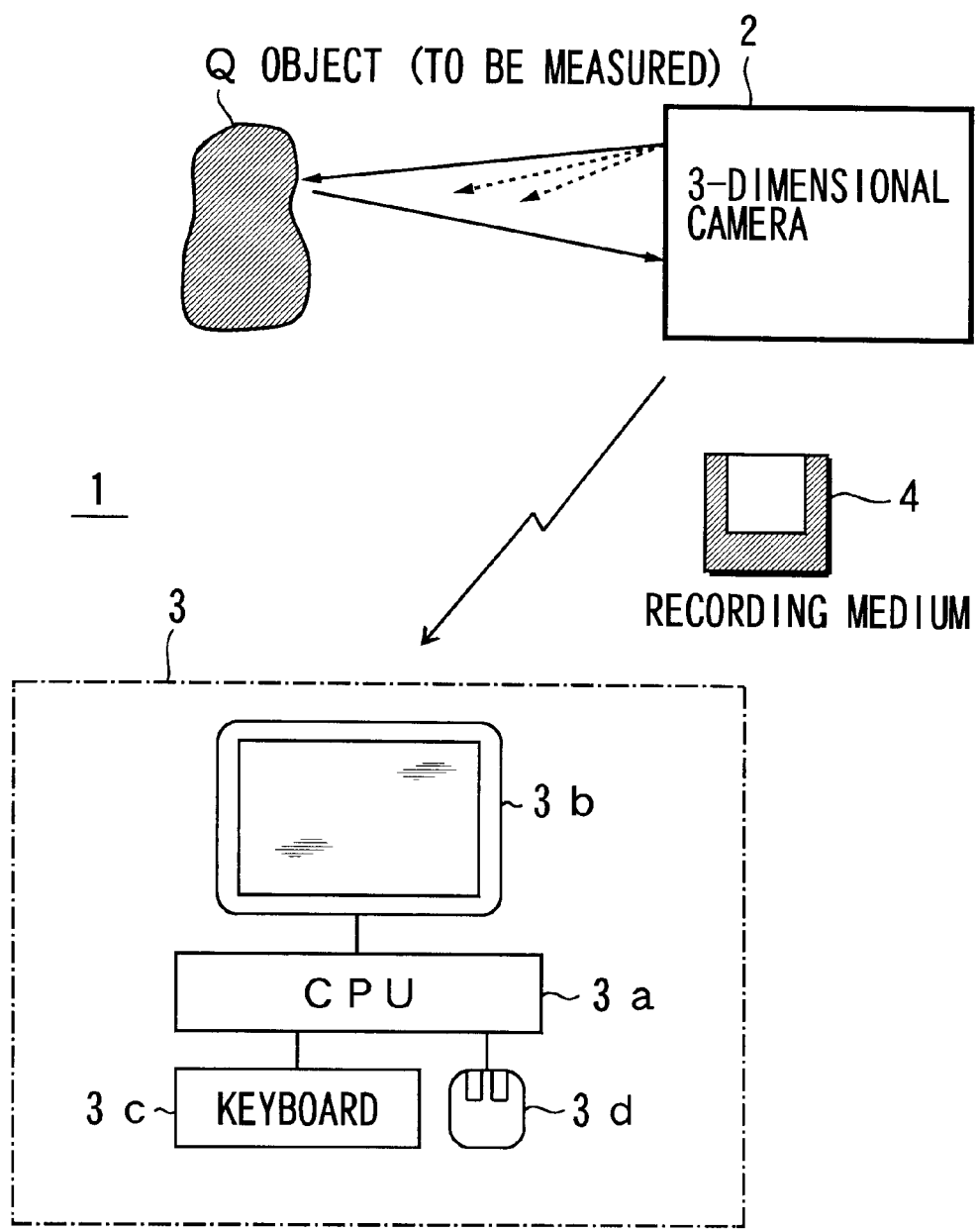

THREE-DIMENSIONAL INFORMATION MEASURING APPARATUS

This application is based on Japanese Patent Application No. 87551/1999 filed on Mar. 30, 1999, the contents of which are incorporated herein by reference.

BACKGROUND OF THE INVENTION

1. Field of the Invention

The present invention relates to a three-dimensional information measuring apparatus for obtaining data about a profile of an object or a distance to an object.

2. Description of the Prior Art

A non-contact type three-dimensional information measuring apparatus which enables rapid measurement compared with a contact type is used for data input into a CG system or a CAD system, physical measurement, visual sense of a robot or other applications.

A slit light projection method (also referred to as a light cutting method) is known as the measurement method suitable for the non-contact type three-dimensional information measuring apparatus. This method is a method for obtaining a distance image by scanning an object optically, and is one of active measurement methods for taking an image of an object by irradiating a reference light beam. The distance image is a set of pixels that indicate three-dimensional positions of plural parts of the object. In the slit light projection method, a slit light beam having a slit-like section is used as the reference light beam and is deflected in the width direction of the slit for line sequential scanning. The longitudinal direction of the slit is the primary scanning direction, and the width direction of the slit is the secondary scanning direction. At a certain time point in the scanning, a part of the object is irradiated and an emission line that is curved in accordance with bumps and dips of the irradiated part appears on a light reception surface of the imaging system. Therefore, a group of three-dimensional input data that determine the shape of the object can be obtained by sampling intensity of each pixel of the light reception surface periodically in the scanning.

The size of the object that can be measured depends on an angle of view and a distance to the object (a shooting distance) for taking the image. If an auto focus (AF) is performed, a distance to the object is measured before taking the image. In addition, there is a three-dimensional information measuring apparatus that has a function for setting the irradiation angle range of the slit light beam to an optimal value automatically in accordance with the measured distance to the object and the angle of view at that time point.

In the conventional three-dimensional information measuring apparatus, a light beam entering the imaging lens is extracted by a half mirror and is led to an AF sensor for measuring a distance to the object. This is so-called a TTL distance measuring method in which the direction of measuring the distance and the direction of the light reception axis for taking the image are substantially the identical.

In the above-mentioned measurement of distance to the object, it is considered to use an AF sensor that is disposed at the position separate from the imaging lens. Thus, a flexibility of the design of the imaging lens can be enhanced. In addition, using an active type sensor that is used commonly for a compact silver-halide film camera as the AF sensor, the three-dimensional information measuring apparatus can be inexpensive.

However, if the AF sensor is arranged so that the direction of measuring the distance is parallel with the direction of the optical axis for taking the image in the same way as the compact silver-halide film camera, the following problem comes up. When the size of the object of three-dimensional data input is smaller than a predetermined value, it is difficult to measure the distance to the object with a predetermined accuracy regardless of whether the position of the object is near or far. This is caused because the position of the AF sensor is separated from the optical axis by at least the distance corresponding to the diameter of the imaging lens. Another problem is that the rate of the misregistration between the optical axis and the AF sensor with respect to the view of imaging varies substantially in accordance with the distance to the object, and an adjustment of a focal point has a tendency to become incorrect when the distance to the object becomes short.

SUMMARY OF THE INVENTION

The object of the present invention is to enable the three-dimensional data input of a small object when a distance measuring sensor is disposed at the external of the imaging lens. Another object is to make uniformity of influence of the misregistration between the imaging lens and the distance measuring sensor over the whole range of distance in which the image can be obtained for the three-dimensional data input.

A three-dimensional information measuring apparatus for obtaining data about a position of an object according to the present invention comprises an imaging sensor, an imaging optical system for leading an optical image of the object to the imaging sensor, and a distance measuring module for measuring a distance to the object in the direction inclining a predetermined angle with respect to the optical axis of the imaging optical system.

BRIEF DESCRIPTION OF THE DRAWINGS

FIG. 1 is a structural diagram of a measuring system according to the present invention.

DESCRIPTION OF THE PREFERRED EMBODIMENTS

FIG. 1 is a structural diagram of a measuring system.

The measuring system 1 includes a three-dimensional camera 2 that performs three-dimensional measurement by slit light beam projection method and a host 3 that processes the output data of the three-dimensional camera 2.

The three-dimensional camera 2 outputs measured data specifying a three-dimensional position of a sampling point of an object Q to be measured, a color image of the object Q and data used for calibration. The host 3 performs the operation process determining the coordinate of the sampling point using triangulation techniques.

The host 3 is a computer system including a CPU $3a$, a display $3b$, a keyboard $3c$ and a mouse $3d$. The CPU $3a$ employs software for processing measured data. Data can be transferred between the host 3 and the three-dimensional camera 2 by two ways which are an online communication using cables or infrared beam and an offline data transportation using a removable recording medium 4. A magneto-optic disk (MO), a mini disk (MD) and a memory card can be used as the recording medium 4.

Figure 2A:
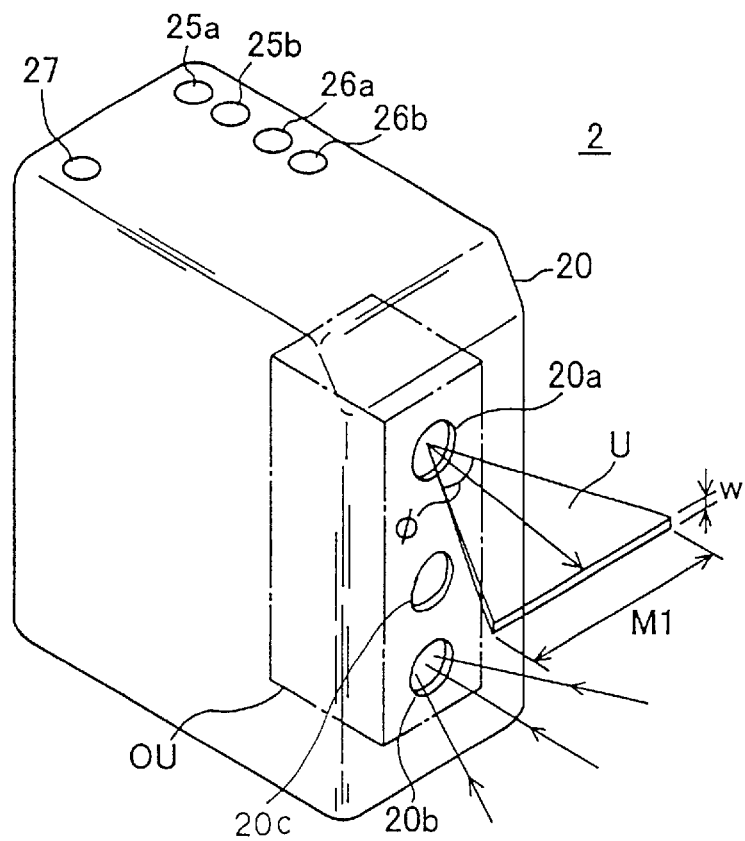
FIGS. 2A and 2B are diagrams of an appearance of a three-dimensional camera.
Figure 2B:
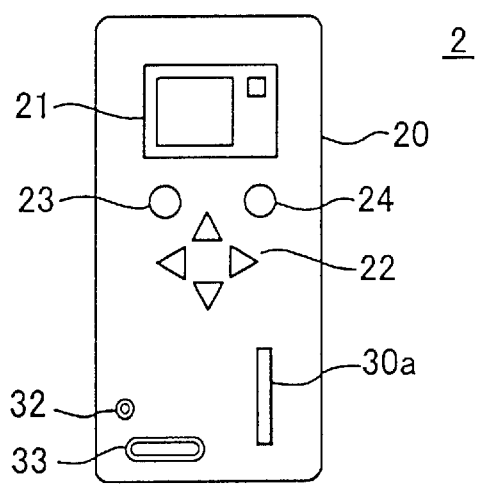

FIGS. 2A and 2B are diagrams of an appearance of a three-dimensional camera.

The front surface of housing 20 is provided with a light irradiation window 20a and a light reception window 20b. The light irradiation window 20a is disposed at the upper position of the light reception window 20b. A slit light beam U having a predetermined width w emitted by an inner optical unit OU passes through the light irradiation window 20a toward an object to be measured. The irradiation angle φ of the slit light beam U in the longitudinal direction M1 is fixed. A part of the slit light beam U reflected by the object passes through the light reception window 20b and enters the inner optical unit OU. The inner optical unit OU has a biaxial adjustment mechanism for correcting the relationship between the light irradiation axis and the light reception axis. Another window 20c for an AF module is provided at the upper adjacent position to the light reception window 20b.

The upper surface of the housing 20 is provided with zooming buttons 25a and 25b, manual focusing buttons 26a and 26b, and a shutter button 27. As shown in FIG. 2B, the rear surface of the housing 20 is provided with a liquid crystal display (LCD) 21, a cursor button 22, a select button 23, a cancel button 24, an analog output terminal 32, a digital output terminal 33 and an insertion opening 30a for a recording medium 4.

The liquid crystal display 21 is used as display means of operation screen and an electronic finder. A user (a camera operator) can use the buttons 21–24 on the rear surface for setting an imaging mode. The analog terminal 32 outputs a color image signal such as an NTSC format signal.

The digital output terminal 33 is a SCSI terminal, for example.

The user sets a desired operation mode in accordance with guidance on the operation screen displayed by the liquid crystal display 21. After that, the user determines the position and the orientation of the camera for setting the angle of view with viewing the color monitor image. Zooming operation can be performed in accordance with the necessity. The object to be measured is arranged at the center of the screen (i.e., in the optical axis direction of the imaging lens).

Figure 3:
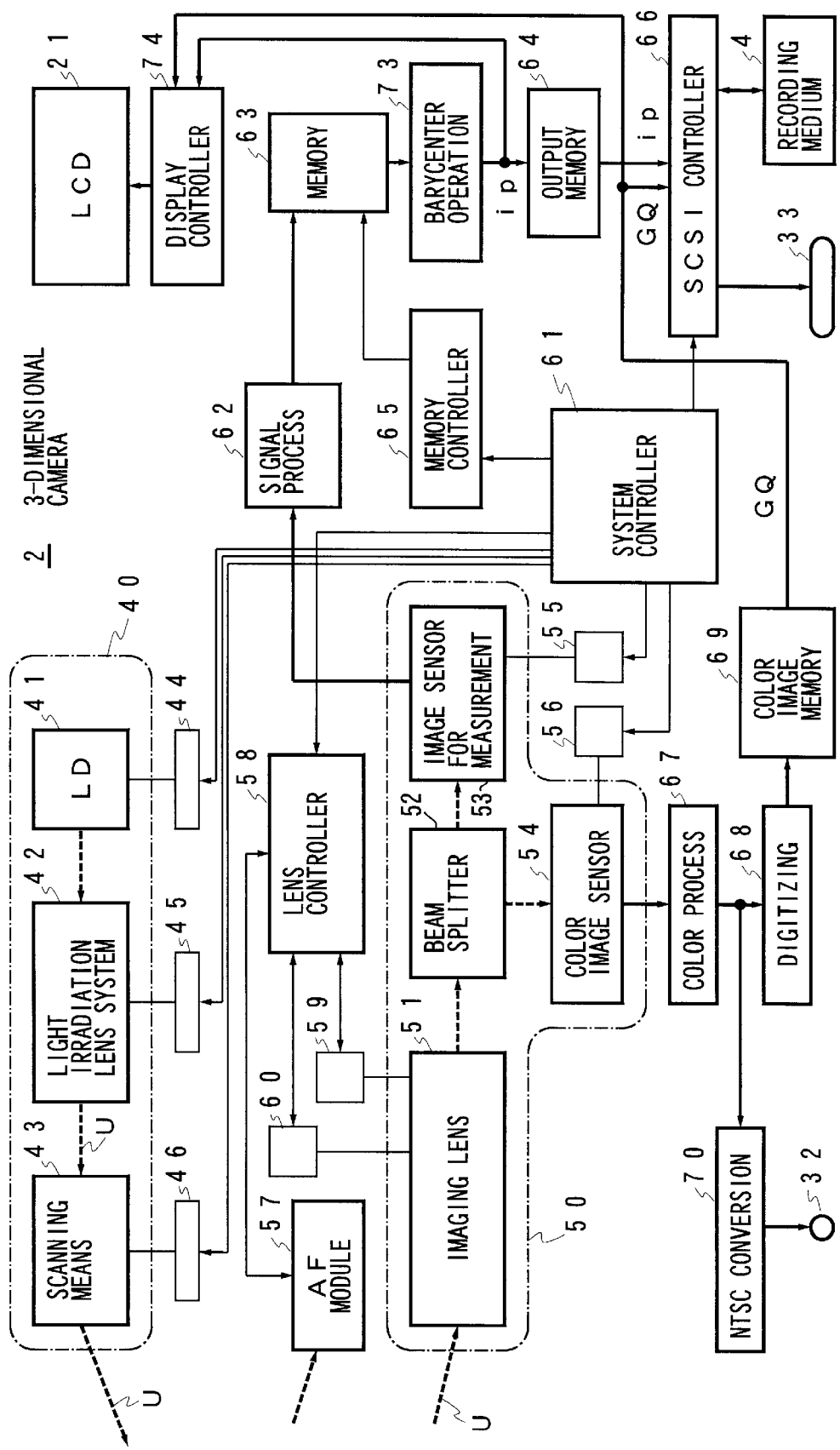
FIG. 3 is a block diagram showing a functional configuration of the three-dimensional camera.

FIG. 3 is a block diagram showing a functional configuration of the three-dimensional camera. The arrows of solid line indicate flows of electric signal and the arrows of broken line indicate flows of light beam.

The three-dimensional camera 2 includes a light irradiation optical system 40 and an imaging system 50 that constitute the above-mentioned inner optical unit OU.

In the light irradiation optical system 40, a laser beam having wavelength of 685 nanometers emitted by a semiconductor laser (LD) 41 becomes the slit light beam U after passing through a light irradiation lens system 42 and is deflected by a galvanomirror 43. A driver 44 of the semiconductor laser 41, a driving system 45 of the light irradiation lens system 42 and a driving system 46 of the galvanomirror 43 are controlled by a system controller 61.

In the imaging system 50, the light beam condensed by the imaging lens 51 is divided by a beam splitter 52. The light beam having wavelength within the oscillation wavelength band of the semiconductor laser 41 enters an image sensor 53 for measuring. The light beam of visible light band enters a color image sensor 54 for monitoring. The image sensor 53 and the color image sensor 54 are CCD imaging devices. However, MOS sensors or other imaging devices can be used for the image sensor 53 and the color image sensor 54. In order to perform auto focusing (AF) of the imaging lens 51, an AF module 57 is disposed at the upper adjacent portion to the imaging lens 51. AF module 57 can be an active type sensor that is a combination of an infrared light emitting diode and a position sensing detector (PSD). Alternatively, a passive type optical sensor or an ultrasonic type sensor can be used.

The lens controller 58 controls the focusing drive system 59 in accordance with the front distance to the object measured by the AF module 57 and instructs the zooming drive system 60 for electric zooming. The measurement of the object can be performed after the focusing and the zooming.

The information of the object flows in the three-dimensional camera 2 as follows.

First, the image information obtained by the image sensor 53 is transferred to a signal processing circuit 62 in synchronization with a clock signal given by the driver 55. The signal processing circuit 62 includes an amplifier that amplifies a photoelectric converted signal of each pixel generated by the image sensor 53 and an analog to digital converter that converts the photoelectric converted signal into an eight-bit light reception signal. The light reception data obtained by the signal processing circuit 62 are memorized temporarily by a memory 63 and transferred to a barycenter operation circuit 73 after accumulating predetermined frames. The address assignment is performed by a memory controller 65. The barycenter operation circuit 73 calculates a barycenter ip on the time axis of the received light distribution for each pixel of the image sensor 53 in accordance with the light reception data obtained by plural times of shooting, and output the barycenter ip as the measured data to the output memory 64. The barycenter ip is data used for calculating a three-dimensional position and indicates a time when the optical axis of the slit light beam U passes the range of the object surface viewed by each pixel of the image sensor 53.

An incident angle as well as a distance between a start point of light irradiation and a principal point of light reception (base line length) for each pixel is known. In addition, a light irradiation angle at the barycenter ip is determined on the basis of the passing time from the start of light irradiation. Therefore, the coordinate of the object can be determined in accordance with the barycenter ip. By calculating the barycenter ip, the measurement can be performed with a resolution higher than that defined by the pixel pitch of the light reception surface. The calculated barycenters ip are memorized by the memory in the display controller 74 one after another and are displayed on the screen of the liquid crystal display 21. The value of the barycenter ip is large if the position of the surface of the object Q is close to the three-dimensional camera 2 and is small if the position of the surface of the object Q is far from the three-dimensional camera 2. Therefore, the distance distribution that is a measurement result is visible by displaying a gray scale image using the barycenter ip of each pixel of the image sensor 53 as density data.

The image information obtained by the color image sensor 54 is transferred to the color processing circuit 67 in synchronization with a clock signal given by the driver 56. The image information processed by color process is output online via an NTSC conversion circuit 70 and the analog terminal 32, or is stored in a color image memory 69 after being digitized by the digitizing circuit 68. After that, color image data GQ are transferred from the color image memory 69 to the SCSI controller 66, are output online from the digital output terminal 33 or are stored in the recording medium 4 associated with the measured data. The color image is displayed by the liquid crystal display 21 as reference information for setting the angle of view. The color image has the same angle of view as the distance image obtained by the image sensor 53 and is used as reference information for the host 3 to perform the three-dimensional data processing. The process using the color image includes a process of generating a shape model by combining plural sets of measured data obtained in different camera view points and a process of thinning out unnecessary vertexes of the shape model.

Figure 4:
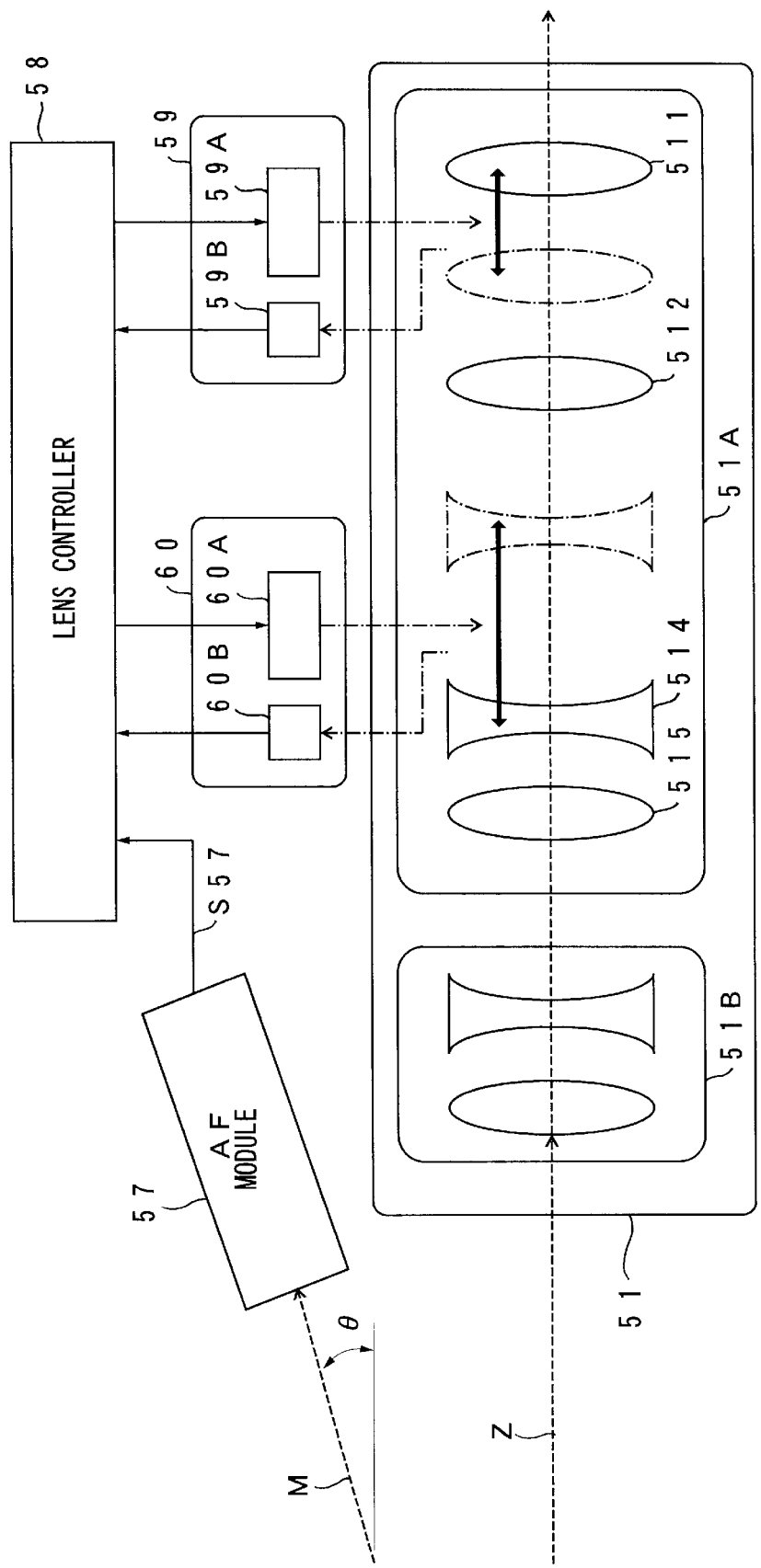
FIG. 4 is a structural diagram of an imaging lens.

FIG. 4 is a structural diagram of an imaging lens.

The imaging lens 51 includes an image formation portion 51A that can perform zooming and an afocal type anamorphic lens 51B for enhancing the resolution. The image formation portion 51A includes a front fixed lens 515, a variator lens 514, rear fixed lens 512 and a focusing lens 511. The variator lens 514 and the focusing lens 511 can be moved independently of each other along the optical axis Z. The anamorphic lens 51B is arranged so as to have the same optical axis in front of the image formation portion 51A in such a way that the scaling factor in the base line direction is larger than that in the direction perpendicular to the base line direction.

The movement of the variator lens 514 in the image formation portion 51A is performed by a zooming drive portion 60. The zooming drive portion 60 includes a pulse motor 60A that drives the lens and a home position switch 60B that detects the home position. The variator lens 514 moves a distance corresponding to a rotation of the pulse motor 60A with respect to the point in which the home position switch 60B operates.

The movement of the focusing lens 511 is performed by the focusing drive system 59. The focusing drive system 59 includes a pulse motor 59A that drives the lens and a home position switch 59B that detects the home position. The focusing lens 511 moves a distance corresponding to a rotation of the pulse motor 59A with respect to the point in which the home position switch 59B operates. The movement thereof is controlled by the lens controller 58 in accordance with a distance signal S57 generated by the AF module 57.

The AF module 57 is arranged in such a way that a distance measurement axis (an imaginary line indicating the direction of distance measurement) M is inclined to the optical axis Z by a minute angle θ so that the distance measurement axis M and the optical axis (the imaging direction) Z of the imaging lens 51 cross each other in the same plane along the vertical direction of the three-dimensional camera 2.

Figure 5:
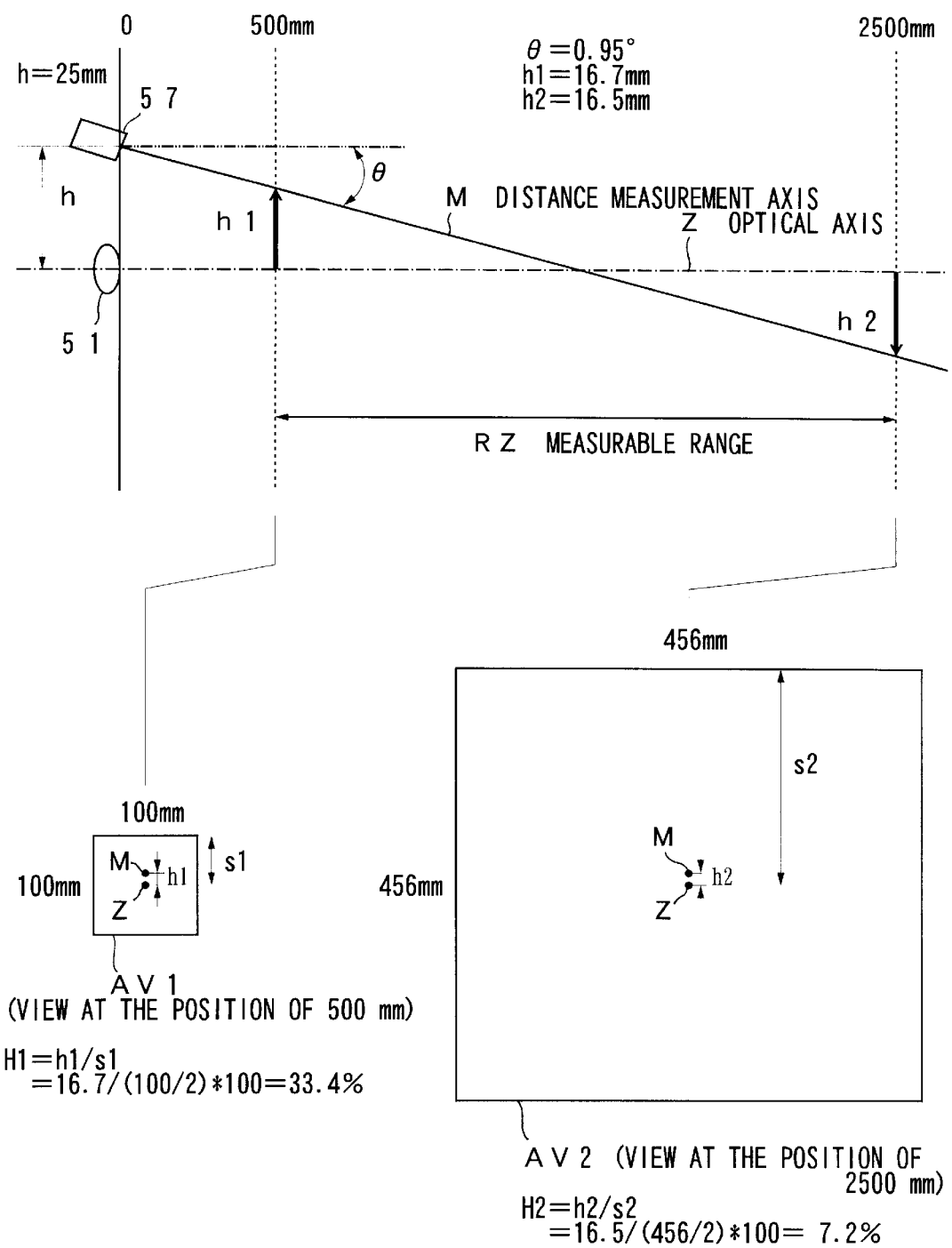
FIG. 5 is a diagram showing a first example of setting the direction of distance measurement.
Figure 6:
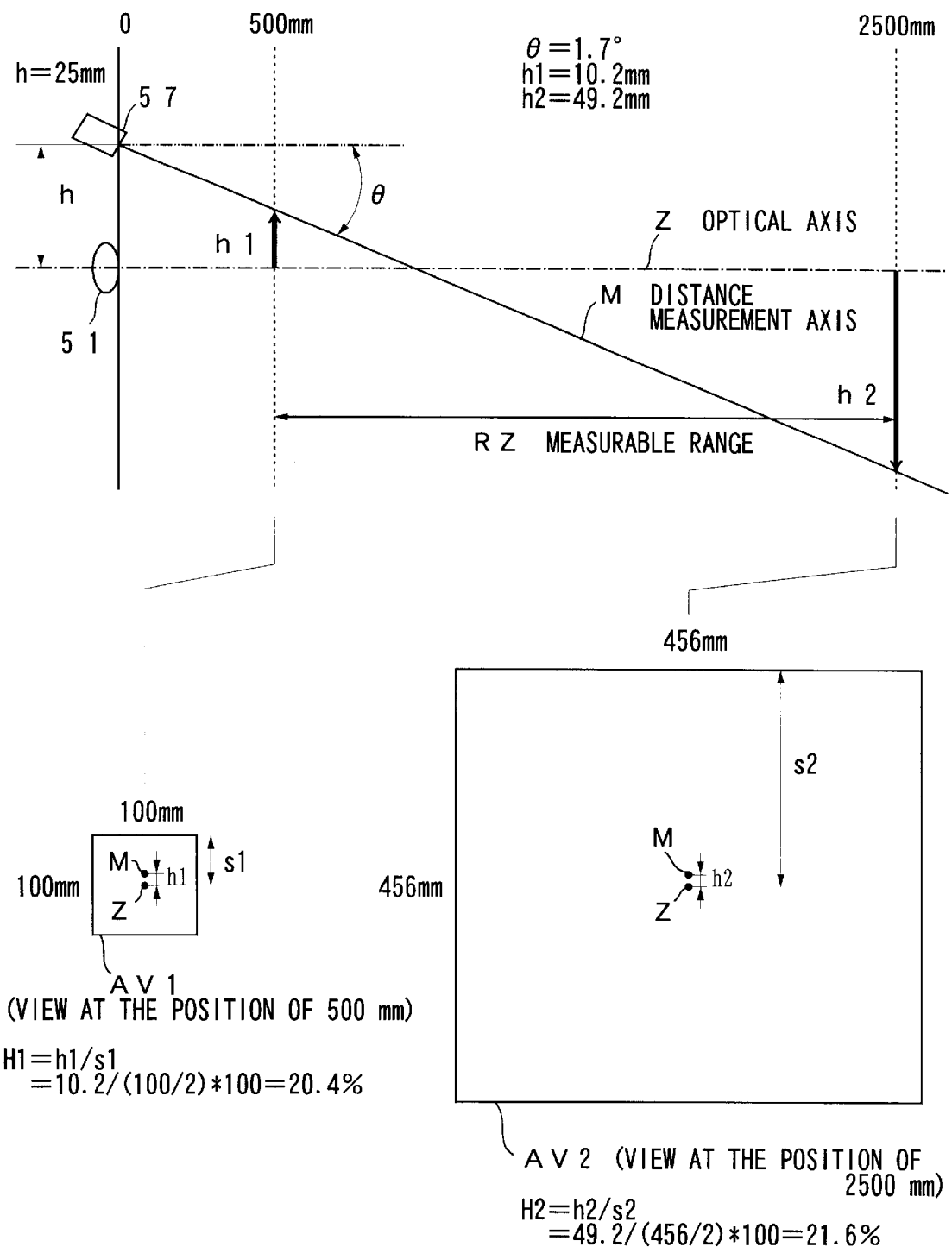
FIG. 6 is a diagram showing a second example of setting the direction of distance measurement.

FIG. 5 is a diagram showing a first example of setting the direction of distance measurement. FIG. 6 is a diagram showing a second example of setting the direction of distance measurement.

It is desirable that the position of the AF module 57 is as close to the optical axis Z as possible. However, a misregistration of a certain quantity h is generated between the start point of distance measurement and the optical axis Z depending on the size of imaging lens 51. Supposing that the distance measurement axis M is parallel with the optical axis Z, the misregistration between the distance measurement axis M and the optical axis Z has the same value h at any position in the depth direction along the optical axis Z, so there is a possibility that the distance measurement cannot be performed when the object of the three-dimensional measurement is smaller than the value h. Therefore, in the three-dimensional camera 2, the distance measurement axis M is inclined to the optical axis Z as explained above.

In FIGS. 5 and 6, the distance range in which the three-dimensional measurement can be performed (the measurable range) RZ is a range whose distance from the front surface of the imaging lens 51 in the optical axis direction is 500–2,500 mm. The misregistration quantity h between the distance measurement axis M and the optical axis Z at the distance zero is supposed to be 25 mm. The view of imaging becomes larger along with being distant from the lens. The view AV1 at the front end (the position at 500 mm) in the measurable range RZ is 100 mm square size, while the AV2 at the rear end (the position at 2,500 mm) is 465 mm square size. The measurable range in the present embodiment is determined by the width of the light reception range of the image sensor 53 (the number of lines in the secondary scanning direction). In the three-dimensional camera of the present embodiment, reading the signal out of the image sensor 53 that is an area sensor for measurement is performed as follows. In the light reception of one slit light beam, signals of the part of the entire area of the area sensor that the slit light beam enters are read out. Namely, the object being out of the measurable range cannot be measured since the slit light beam U reflected by the object forms image at the outside of the light reception range.

In the example shown in FIG. 5, the inclining angle θ of the distance measurement axis M is set so that the misregistration quantity h1 at the position of 500 mm and the misregistration quantity h2 at the position of 2,500 mm are substantially the same. Specifically, the inclining angle θ is 0.95 degrees, the misregistration quantity h1 is 16.7 mm and the misregistration quantity h2 is 16.5 mm. In this example, the ratio of the misregistration quantity h1 to the view AV1 is 33.4% and the misregistration quantity h2 to the view AV2 is 7.2%. The ratios H1 and H2 mean ratios of the misregistration quantities h1 and h2 to the minimum distances s1 and s2 from the center of the view to the end edge, respectively (H1=h1/s1, H2=h2/s2).

In the example shown in FIG. 6, the inclining angle θ of the distance measurement axis M is set so that the ratio H1 of the misregistration at the position of 500 mm and the ratio H2 of the misregistration at the position of 2,500 mm are substantially the same. Specifically, the inclining angle θ is 1.75 degrees, the ratio H1 is 20.5% and the ratio H2 is 21.6%. In this example, the misregistration quantity h2 at the position of 2,500 mm is 49.2 mm that is greater than 25 mm. The influence of the misregistration is substantially the same as that at the position of 500 mm, so there is no problem for the practical use.

Thus, by intersecting the distance measurement axis M and the optical axis Z of the imaging in the three-dimensional measurement at the position of the measurable range RZ, the misregistration quantities h1 and h2 of the distance measurement axis M and the optical axis Z can be reduced, and the ratios H1 and H2 of the misregistration quantities to the view can be made uniform. The ratios H1 and H2 of the misregistration quantities are 50% and 11% respectively in the case where the distance measurement axis M is set parallel with the optical axis Z under the condition shown in FIGS. 5 and 6.

Thus, in the case where a distance measuring sensor is provided externally to the imaging lens, the lower limit of the size range of the object that can be measured by the three-dimensional data input can be lowered, and the influence of the misregistration between the imaging lens and the distance measuring sensor can be made uniform over the entire range of distance in which the imaging for three-dimensional data input can be performed, so as to enhance the practical use.

The present invention is not limited to the example explained above, in which the imaging lens having plural lenses aligned along a linear optical axis is used as an imaging optical system of the slit light beam. The imaging optical system can include a mirror and a bent optical axis.

Concerning the relationship between the optical axis of the light reception optical system and the distance measurement axis (the distance measurement direction) of the AF module, it is not limited to the strictly crossing relationship, but may be a skew lines relationship including a little misregistration.

The AF module may be arranged to be adjustable in the angle so that the distance measurement direction of the AF module can be set in any direction.

What is claimed is:

1. A three-dimensional information measuring apparatus for obtaining data about a position of an object, comprising:
   an imaging sensor;
   an imaging optical system for leading an optical image of the object to the imaging sensor; and
   a distance measuring module for measuring a distance to the object in the direction inclining a predetermined angle to the optical axis of the imaging optical system, wherein the distance measuring module is arranged so as to face in the direction substantially crossing an optical axis of the imaging optical system within a distance range in which the three-dimensional measurement can be performed.

2. The three-dimensional information measuring apparatus according to claim 1, wherein the distance measuring module is arranged so that a misregistration quantity between the optical axis and the distance measurement direction at the minimum distance within the distance range is substantially the same as a misregistration quantity between the optical axis and the distance measurement direction at the maximum distance within the distance range.

3. The three-dimensional information measuring apparatus according to claim 1, wherein the distance measuring module is arranged so that a ratio of a misregistration quantity between the optical axis and the distance measurement direction at the minimum distance within the distance range is substantially the same as a ratio of a misregistration quantity between the optical axis and the distance measurement direction at the maximum distance within the distance range.

4. The three-dimensional information measuring apparatus according to claim 1, further comprising a light irradiation device for irradiating a reference light beam to the object.

5. The three-dimensional information measuring apparatus according to claim 4, wherein the imaging sensor reads signals of only a part of the entire light reception range that the reference light beam enters.

6. The three-dimensional information measuring apparatus according to claim 1, further comprising a controller for adjusting a focus of the imaging optical system in accordance with the output of the distance measuring module.

7. The three-dimensional information measuring apparatus according to claim 1, wherein the distance measuring module is an active-type distance measuring module.

8. The three-dimensional information measuring apparatus according to claim 1, wherein the distance measuring module is a passive-type distance measuring module.

9. The three-dimensional information measuring apparatus according to claim 1, wherein signals of only a part of the entire light reception range that the reference light beam enters are read.

10. A three-dimensional information measuring apparatus that is capable of measuring an object existing within a distance range in which the three-dimensional measurement can be performed, comprising:
    a light irradiation device for irradiating a reference light beam to the object;
    a light reception device;
    an imaging optical system for leading the reference light beam reflected by the object to the light reception device; and
    a distance measuring module for measuring a distance to the object, wherein the distance measuring module is disposed separately from an imaging lens, and a distance measurement axis indicating a distance measurement direction of the module is arranged so as to cross substantially an optical axis of the imaging optical system within the predetermined distance range.

11. The three-dimensional information measuring apparatus according to claim 10, wherein the distance measuring module is arranged so that a misregistration quantity between the optical axis and the distance measurement axis at the minimum distance within the distance range in which the three-dimensional measurement can be performed is substantially the same as a misregistration quantity between the optical axis and the distance measurement axis at the maximum distance within the predetermined distance range.

12. The three-dimensional information measuring apparatus according to claim 10, wherein the distance measuring module is arranged so that a ratio of a misregistration quantity between the optical axis and the distance measurement axis at the minimum distance within the distance range in which the three-dimensional measurement can be performed is substantially the same as a ratio of a misregistration quantity between the optical-axis and the distance measurement axis at the maximum distance within the predetermined distance range.

13. The three-dimensional information measuring apparatus according to claim 10, wherein the distance measuring module is an active-type distance measuring module.

14. The three-dimensional information measuring apparatus according to claim 10, wherein the distance measuring module is a passive-type distance measuring module.

15. The three-dimensional,information measuring apparatus according to claim 10, wherein the distance measuring module is arranged at the upper adjacent position to an imaging lens.

16. The three-dimensional information measuring apparatus according to claim 10, wherein the light reception device reads signals of only a part of the entire light reception range that the reference light beam enters.

17. A three-dimensional information measuring apparatus comprising:
    a light irradiation device for irradiating a slit-like reference light beam to the object;
    an imaging optical system having an adjustable focus;
    a light reception device for receiving the reference light beam reflected by the object and forming an image through the imaging optical system;

a distance measuring module for measuring a distance to the object; and a controller for adjusting the focus of the imaging optical system in accordance with a measurement result of the distance measuring module, wherein the distance measuring module is arranged so that the distance measurement direction of the module crosses substantially the imaging direction of the imaging optical system within a distance range in which the three-dimensional measurement can be performed.

18. The three-dimensional information measuring apparatus according to claim 17, wherein the light reception device reads signals of only a part of the entire light reception range that the reference light beam enters.

* * * * *